US009836136B2

(12) United States Patent
Jensen et al.

(10) Patent No.: US 9,836,136 B2
(45) Date of Patent: Dec. 5, 2017

(54) VOLTAGE BOOST CIRCUIT FOR A STYLUS PEN

(71) Applicant: Microsoft Technology Licensing, LLC, Redmond, WA (US)

(72) Inventors: Michael Jensen, Duvall, WA (US); Justin Coppin, Windsor, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/859,049

(22) Filed: Sep. 18, 2015

(65) Prior Publication Data

US 2017/0083119 A1 Mar. 23, 2017

(51) Int. Cl.
*G06F 3/0354* (2013.01)
*G06F 3/038* (2013.01)

(52) U.S. Cl.
CPC ........ *G06F 3/03545* (2013.01); *G06F 3/0383* (2013.01)

(58) Field of Classification Search
CPC ........................... G06F 3/03545; G06F 3/0383
See application file for complete search history.

(56) References Cited

U.S. PATENT DOCUMENTS

| 4,670,751 A | 6/1987 | Enokido et al. |
| 5,134,388 A | 7/1992 | Murakami et al. |
| 5,475,401 A | 12/1995 | Verrier et al. |
| 5,654,529 A | 8/1997 | Yeung et al. |
| 5,793,360 A | 8/1998 | Fleck et al. |
| 6,310,615 B1 | 10/2001 | Davis et al. |
| 8,094,140 B2 | 1/2012 | Katsurahira et al. |
| 8,355,008 B2 | 1/2013 | Wu |
| 2004/0125089 A1 | 7/2004 | Chao et al. |
| 2009/0072662 A1* | 3/2009 | Sadler .................. G06F 1/3203 310/319 |
| 2011/0080378 A1 | 4/2011 | Hsu |
| 2012/0105362 A1* | 5/2012 | Kremin ............... G06F 3/03545 345/174 |
| 2012/0293425 A1 | 11/2012 | Lee et al. |
| 2014/0002422 A1 | 1/2014 | Stern et al. |
| 2015/0029161 A1 | 1/2015 | Koo et al. |

OTHER PUBLICATIONS

International Search Report and Written Opinion for PCT/US2016/045950, dated Oct. 31, 2016, 12 pages.

(Continued)

*Primary Examiner* — Charles Hicks
(74) *Attorney, Agent, or Firm* — Klarquist Sparkman, LLP

(57) ABSTRACT

A stylus pen is disclosed that can be used as an input device to a digitizer associated with a computer screen on a computing device, such as a computer, mobile device, tablet, etc. The stylus pen can include a voltage boost circuit that generates a stylus output signal on an antenna output. The voltage boost circuit has a charging portion and a discharging portion. Both portions have transistors that are activated and deactivated through pulsed control signals. However, a pulse duration for each control signal is separately controllable through different RC-based circuits. Additionally, the voltage boost circuit provides power savings by draining the output voltage signal to a positive voltage rail, rather than ground.

20 Claims, 8 Drawing Sheets

(56) References Cited

OTHER PUBLICATIONS

"HP Slate 7 Beats Special Edition, HP Slate 7 Extreme Tablets—Drawing and Writing with the DirectStylus Pen (Android KitKat, Jelly Bean)", Retrieved on: Apr. 13, 2015; Available at: http://support.hp.com/us-en/document/c04024883, 9 pages.
U.S. Appl. No. 14/668,946, Jensen et al., "Stylus Having a Plurality of Operating Portions Configured to Transmit Synchronized Signals," Filed Date: Mar. 25, 2015, 34 pages.
Second Written Opinion of the International Preliminary Examining Authority for PCT/US2016/045950, dated Jul. 7, 2017, 9 pages.

\* cited by examiner

VOLTAGE BOOST CIRCUIT FOR A STYLUS PEN

BACKGROUND

A stylus or a stylus pen is often used as an input device to a digitizer associated with a computer screen, mobile device, graphics tablet, and other devices. With touchscreen devices, a user places a stylus on the surface of the screen to write, draw, or make selections by tapping the stylus on the screen. As such, the stylus is used as a pointing device in addition to a mouse, trackpad, or finger.

There is limited space for circuitry in a stylus, and any functionality should be built with minimal components. Due to the limited room, the stylus is typically powered by a single battery, such as an AAA or AAAA battery, which produce voltage levels of about 1.5V. Communicating with the digitizer is more effective if greater voltage levels can be used for the transmission. Transmissions at higher voltage levels result in a higher, and thus improved, signal-to-noise ratio ("SNR"). However, generating high voltage with a low-voltage battery while maintaining long battery life is challenging due to the restrictions on circuit size, cost, or power.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A stylus pen or other input device is disclosed that can be used as an input device to a digitizer associated with a computer screen on a computing device, such as a computer, mobile device, tablet, etc. The stylus pen can include a voltage boost circuit that generates a stylus output signal on an antenna for transmission to a digitizer.

The voltage boost circuit has a charging portion and a discharging portion. Both portions have transistors that are activated and deactivated through pulsed control signals. However, a pulse duration for each control signal is separately controllable through an RC-based circuit or a microcontroller or other timing control device. For example, a charging signal can have a pulse duration controlled through an RC timing circuit and the discharging signal can have a pulse duration controlled through an AC coupling circuit. Independent control of the pulse durations allows increased design freedom to meet desired circuit specifications including but not limited to the voltage amplitude of the boost.

Additionally, the voltage boost circuit provides power savings by draining the output voltage signal to a positive voltage rail, rather than ground.

The foregoing and other objects, features, and advantages of the invention will become more apparent from the following detailed description, which proceeds with reference to the accompanying figures.

DETAILED DESCRIPTION

A stylus pen is disclosed that includes a voltage boost circuit that can be used to communicate with a digitizer.

Figure 1:
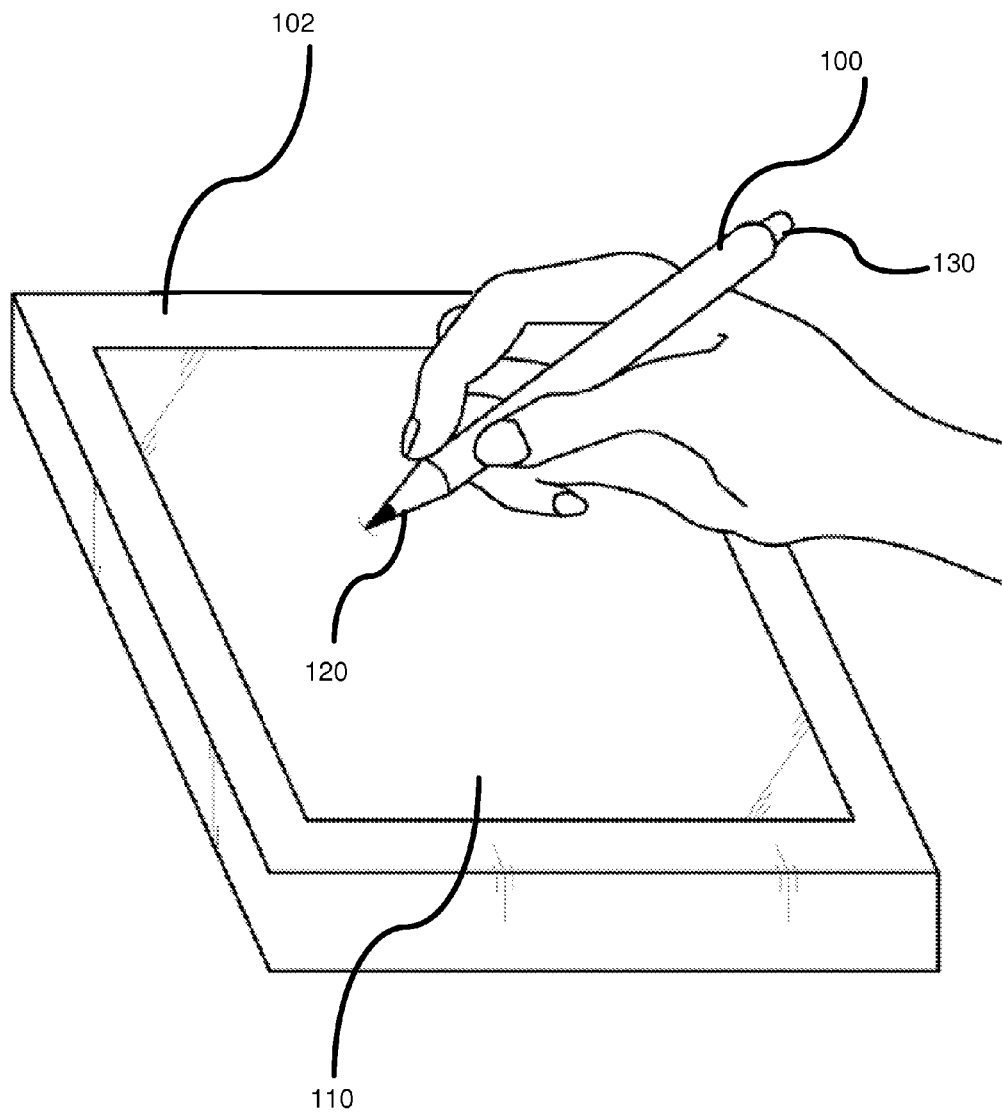
FIG. 1 is a diagram illustrating a user writing on a computing device using a stylus pen according to one embodiment.

FIG. 1 is a diagram showing a stylus pen 100 in communication with a computing device 102 that includes a touch screen 110 to allow a user to write, erase, or move content displayed on the touch screen. The stylus pen 120 typically includes a first end 120, called a stylus tip, for writing content and a second end 130 for performing a digital erasure of the content. The second end 130 can have additional functionality based on a degree of pressure applied thereto. In one example, the second end 130 can be clicked like a traditional pen in order to generate signals that are interpreted by the computing device 102 to perform a desired input function. As further described below, the stylus pen tip 120 and eraser end 130 transmit signals to the computing device 102 so as to operate as a user input device. Although a stylus pen is disclosed, the circuitry described herein can be inserted into other input device types (e.g., mouse, puck, etc.)

Figure 2:
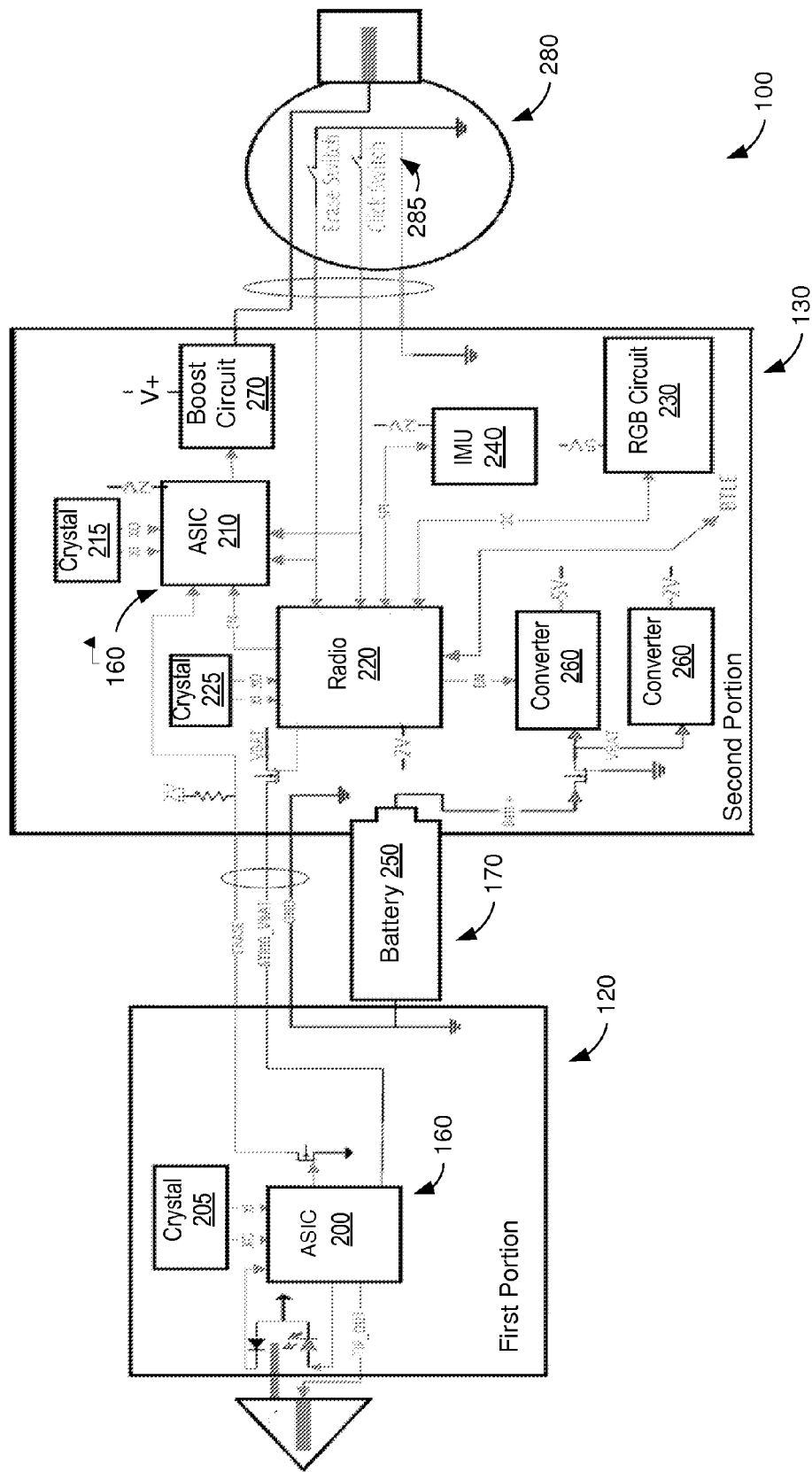
FIG. 2 is a circuit diagram of the stylus pen of FIG. 1 including a boost circuit according to one embodiment.

FIG. 2 is a schematic diagram illustrating example hardware that may be used with the stylus 100. In this example, the stylus 100 includes hardware associated with a first portion 120 (the tip) and a second portion 130 (the tail end). As shown in FIG. 2, the second portion 130 is different from and, in this example, complements the first portion 120.

A control module 160 includes a plurality of components that are located in the first portion 120 and the second portion 130. For example, the first portion 120 may include ASIC 200, which includes the analog frontend circuitry to drive the stylus tip with different voltage waveforms. Thus, ASIC 200 may include amplifiers and other components to generate signals. The first portion 120 may include a clock generation source 205 (e.g., a 32.768 kHz crystal) associated with ASIC 200. The second portion 130 may also include ASIC 210, and a clock generation source 215 (e.g., a 100 kHz crystal) associated with the ASIC 210. In this example, the ASIC 200 generates and/or adjusts a first signal (e.g., write signal, hover signal) and a sync signal.

The first portion 120 and/or second portion 130 may also include a radio 220, a clock generation source 225 (e.g., a 16 MHz crystal) associated with the radio 220, an RGB circuit 230, and/or an inertial measurement unit ("IMU") 240. In this example, the radio 220 enables the stylus 100 to exchange data with another computing device using, for example, a BLUETOOTH® brand wireless technology standard. (BLUETOOTH is a trademark of Bluetooth Special Interest Group). In this example, the RGB circuit 230 includes one or more light emitting diodes configured to emit a light associated with a functionality and/or operation of the stylus 100. The IMU 240 includes one or more accelerometers (not shown) that detects and/or measures a movement and/or orientation of the stylus 100. In at least some examples, the IMU 240 is used to provide an interrupt signal to wake the stylus 100 upon detecting motion.

A power source 170 is coupled to the control module 160, first portion 120 and/or second portion 130. In this example, the power source 170 includes a single battery 250 that supplies a predetermined power level. A plurality of boost converters 260 can be used to step up a voltage provided by the battery 250. A boost circuit 270 increases an output voltage level for transmission of stylus output signals to a digitizer. While the output voltage level can be varied based upon design, the voltage level is typically between 10V and 30V, whereas the battery 250 is typically 1.5V.

The stylus 100 includes a third portion 280. For example, the third portion 280 may include one or more switches 285 that enable an interface to be provided to one or more buttons 190. The third portion can also include an antenna for transmitting signals generated by the boost circuit 270.

Figure 3:
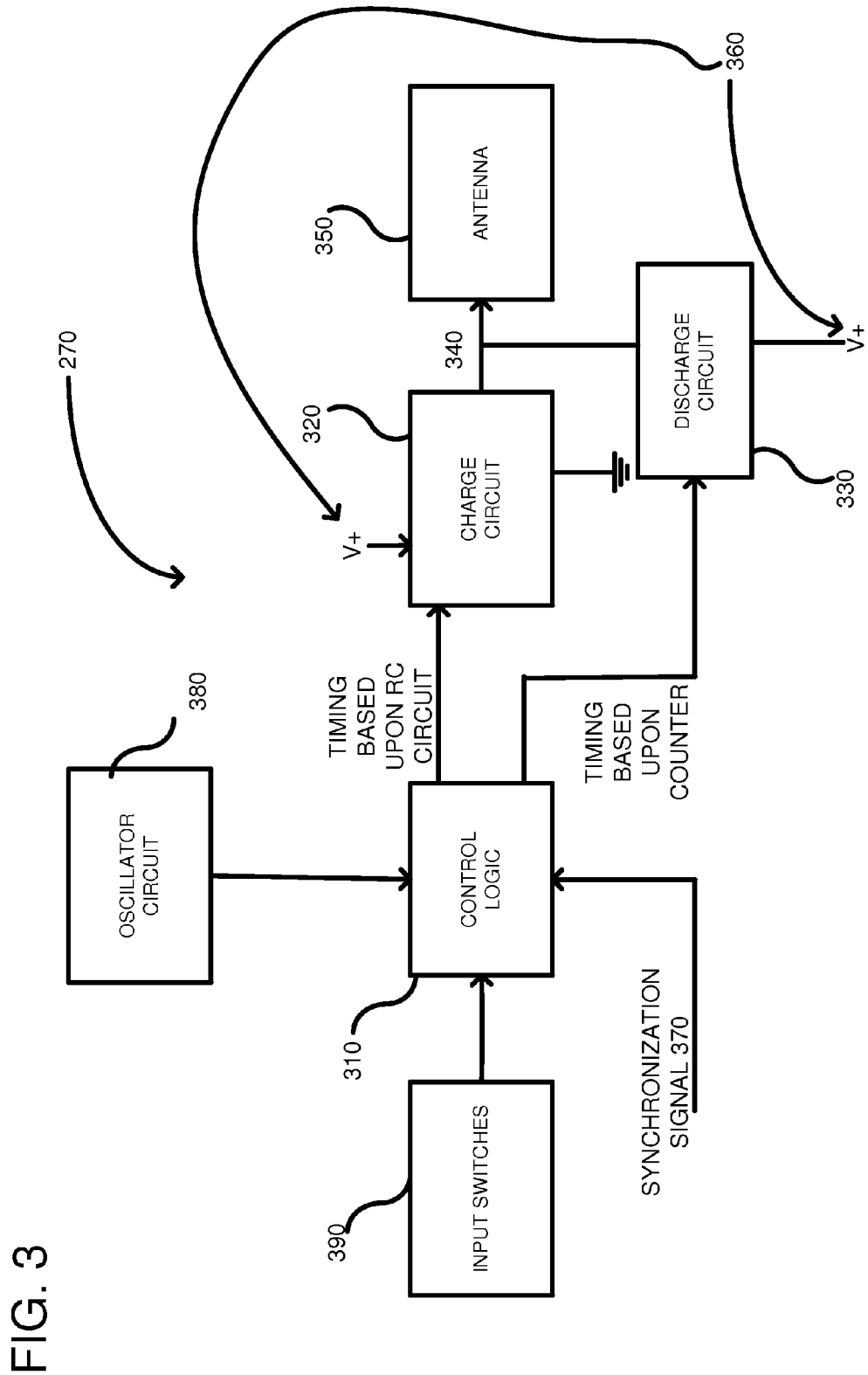
FIG. 3 is a circuit diagram showing a voltage boost circuit of FIG. 2 including control logic, a charge circuit and a discharge circuit.

FIG. 3 shows further details of the boost circuit 270. The boost circuit includes control logic 310, a charge circuit 320, and a discharge circuit 330. As further described below, the boost circuit 270 receives a voltage input V+(typically 1.5V to 2V) from the battery 250 or one of the converters 260 and generates an output voltage 340 typically between 10V and 30V, depending on the design. The elevated output voltage 340 can be used to transmit stylus signals over the antenna 350. Thus, the combination of the charge circuit 320 and the discharge circuit 330 generate pulses at the elevated voltage level. The pulses are used to generate signals that are transmitted from the stylus and used to communicate with a digitizer or other receiver in a computing device. Control logic 310 controls the timing of the charging and discharging of output voltage 340. As further described below, the charge circuit's timing is independent of the timing of the discharge circuit, meaning that the timing of each can be independently adjusted. For example, the timing to the charge circuit 320 can be based upon a resistor-capacitor (RC) circuit, whereas the timing to the discharge circuit 330 can be based upon a counter and/or a separate resistor/capacitor-based AC coupling circuit. Consequently, timing of the RC circuit for the charging circuit can be modified by selecting different values of the resistor or capacitor. The selection does not impact the timing of the discharge circuit. A timing circuit may alternatively be implemented using a digital circuits, including logic and flip-flops, or implemented within a microcontroller or ASIC. The counter timing can be adjusted to count higher or lower based upon when it is desired to pull the output voltage low. Additionally, the AC coupling circuit can be adjusted to change a pulse width applied to a gate of the discharge circuit 330.

In typical circuits, a discharge circuit pulls a voltage to ground. However, in the illustrated embodiment, as shown at 360, the discharge circuit 330 pulls the elevated output voltage to the supply voltage of the charge circuit. By discharging to the supply voltage (as opposed to ground), power is saved allowing the stylus to have longer battery life. Other inputs can be used to control the timing, such as a synchronization signal 370 and an oscillator circuit 380. Input switches can also supply user input that can be used in generation of the stylus signal transmitted over the antenna 350. In addition, by not discharging to ground, current does not flow through the inductor, thereby avoiding an output voltage boost occurring during discharge.

Figure 4:
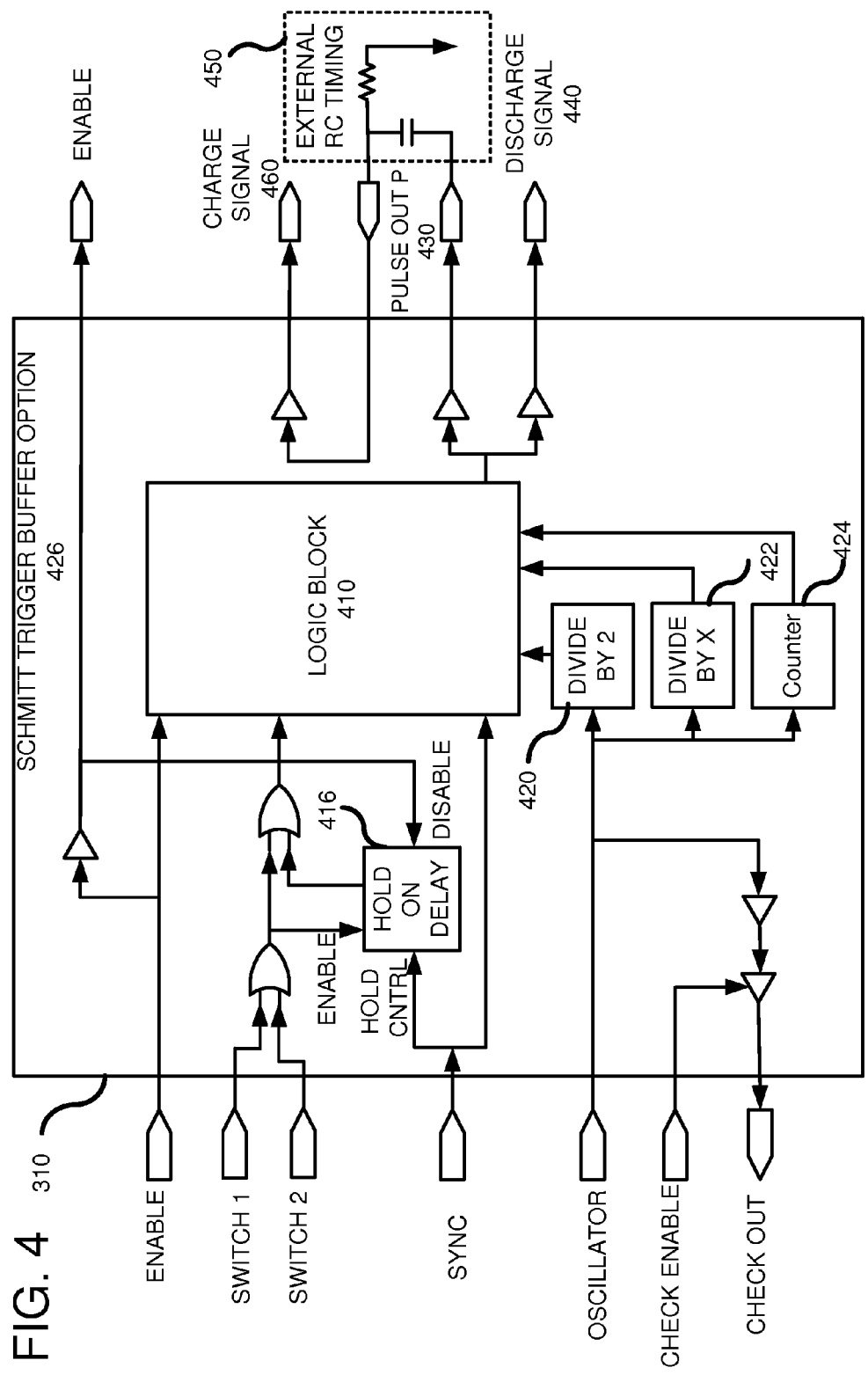
FIG. 4 is a circuit diagram including details of the control logic of FIG. 3.

FIG. 4 shows additional details of the control logic 310. Various inputs are shown along the left hand side of the figure and are design dependent. The illustrated signals include an enable input to turn on or off the circuit. Additionally, the switch signals for switch 1 and switch 2 are input and used by a logic block 410. A sync input is a synchronization signal used to synchronize the digitizer to the stylus pen. The synchronization signal can also be used in conjunction with the timing of the charging and discharging circuits. The sync signal and the switch signals can be input into a hold-on-delay circuit 416. An oscillator input is used to provide a clock signal and controls the timing of the circuit. Check Enable and check out are used to read back out that the oscillator signal is functioning. The oscillator circuit is chosen so that it can be easily divided as indicated by a divide-by-two circuit 420 or a divide-by-X (where X is any value) circuit 422. The oscillator input can also be provided to a counter 424 that increments upon each clock cycle. The counter 424 and outputs from the divider circuits 420, 422 are provided to the logic block 410. A Schmitt trigger buffer option 426 can also be included within the control logic 310.

Based on the various inputs, the logic block 410 can generate a pulse-out signal 430 that starts the timing for the boost circuit 270. The pulse-out signal 430 is input into an RC circuit 450 that has a combination resistor/capacitor timing circuit. The pulse on the pulse out signal line 430 charges the capacitor and generates a charge signal 460. The resistor in the RC circuit 450 drains the charge from the capacitor to ground so as to control a period in which the charge signal 460 is activated. Any desired values can be used for the capacitor and resistor, but example values include 47 pF for the capacitor and 50 Ohms for the resistor. Thus, a period of activation of the charge signal 460 can be adjusted through changing of the values of the resistor and capacitor in the RC timing circuit 450, which is independent of a period of activation for the discharge signal 440. The discharge signal 440, in contrast, is activated based on the counter circuit 424. A duration of activation of the discharge gate signal is based on an AC coupling circuit described below. Consequently, although both the charge and discharge signals are synchronized through the pulse-out signal 430, the timing of their durations as applied to the gates (the pulse width during which they activate the transistors) are independently controlled.

Figure 5:
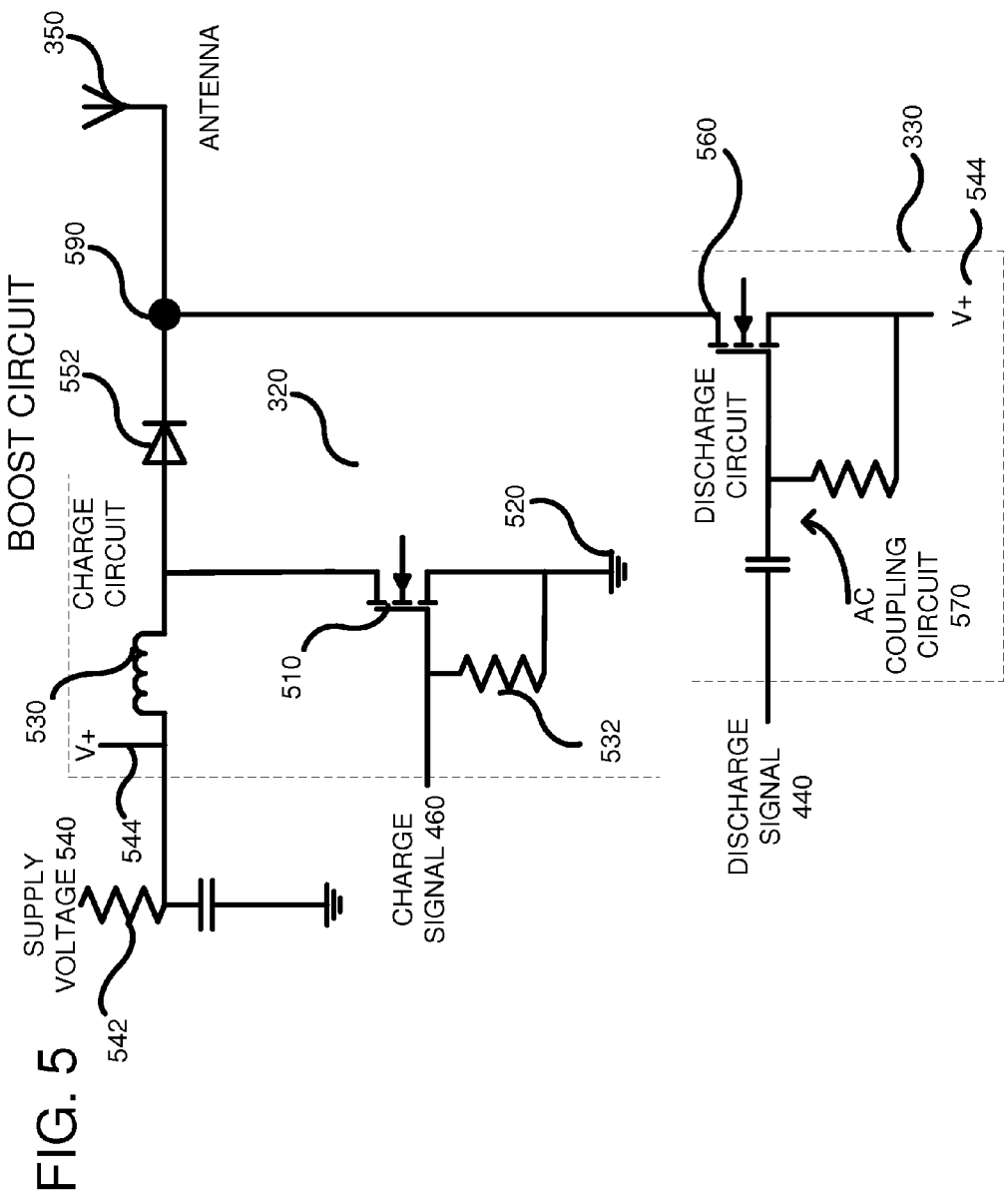
FIG. 5 is a detailed circuit diagram of the charge circuit and discharge circuit of FIG. 3.

FIG. 5 provides further details of the charge circuit 320 and the discharge circuit 330. The charge circuit 320 includes a charging transistor 510 that is shown as an N-channel FET, but other transistors can be used, such as bipolar transistors. One of the terminals of the charging transistor 510 (i.e., the source) is coupled to ground 520, and the other terminal (i.e., the drain) is coupled to an output of an inductor 530 (e.g., 1 mH, 2.4 MHz). The gate of the transistor 510 is coupled to the charge signal 460 (also called the charging control signal). A resistor 532 (e.g., 1 megaOhm) can be coupled between the charge signal 460 and ground 520. The input of the inductor 530 is coupled to a supply voltage 540 through a resistor 542 (e.g., 10 Ohms) An input voltage 544 to the inductor 530 is substantially a same voltage level as the supply voltage 542 and is called herein a voltage rail or the voltage supply. The output of the inductor 530 is coupled to the output antenna 350 through a diode 552.

The discharge circuit 330 includes a discharging transistor 560, which is an N-channel FET, but can be other transistors or types similar to the charging transistor 510. The discharging transistor 560 is coupled at one of its terminals (i.e., the source) to the voltage rail 544. Using the voltage rail 544 as a connection to the discharging transistor 560 has provided substantial power savings for the boost circuit. However, by using the voltage rail 544 as the source, the discharging transistor 560 can have difficulty switching on due to an insufficient gate-to-source voltage differential. Accordingly, an AC coupling circuit 570 has been added to a gate of the discharging transistor 560. The AC coupling circuit includes a capacitor/resistor combination that boost the gate voltage above the rail voltage level for a period of time based on the resistor/capacitor values of the AC coupling circuit 570. Example values of the capacitor can be 47 pF and the resistor can be 50 Ohms. The AC coupling circuit 570 receives as input the discharge signal 440 and provides an elevated discharging control signal to the gate of the discharge transistor 560 in response thereto. As a result, the AC coupling circuit can control a period of the discharging control signal applied to the gate and modification of the period is independent of the period of the charging control signal 460. By independently controlling the periods of the charging control signal and the discharging control signal through different resistor and capacitor combinations, greater design freedom is provided. A drain of the discharging transistor 560 is coupled to the output of the inductor 530 through the diode 552.

Figure 6:
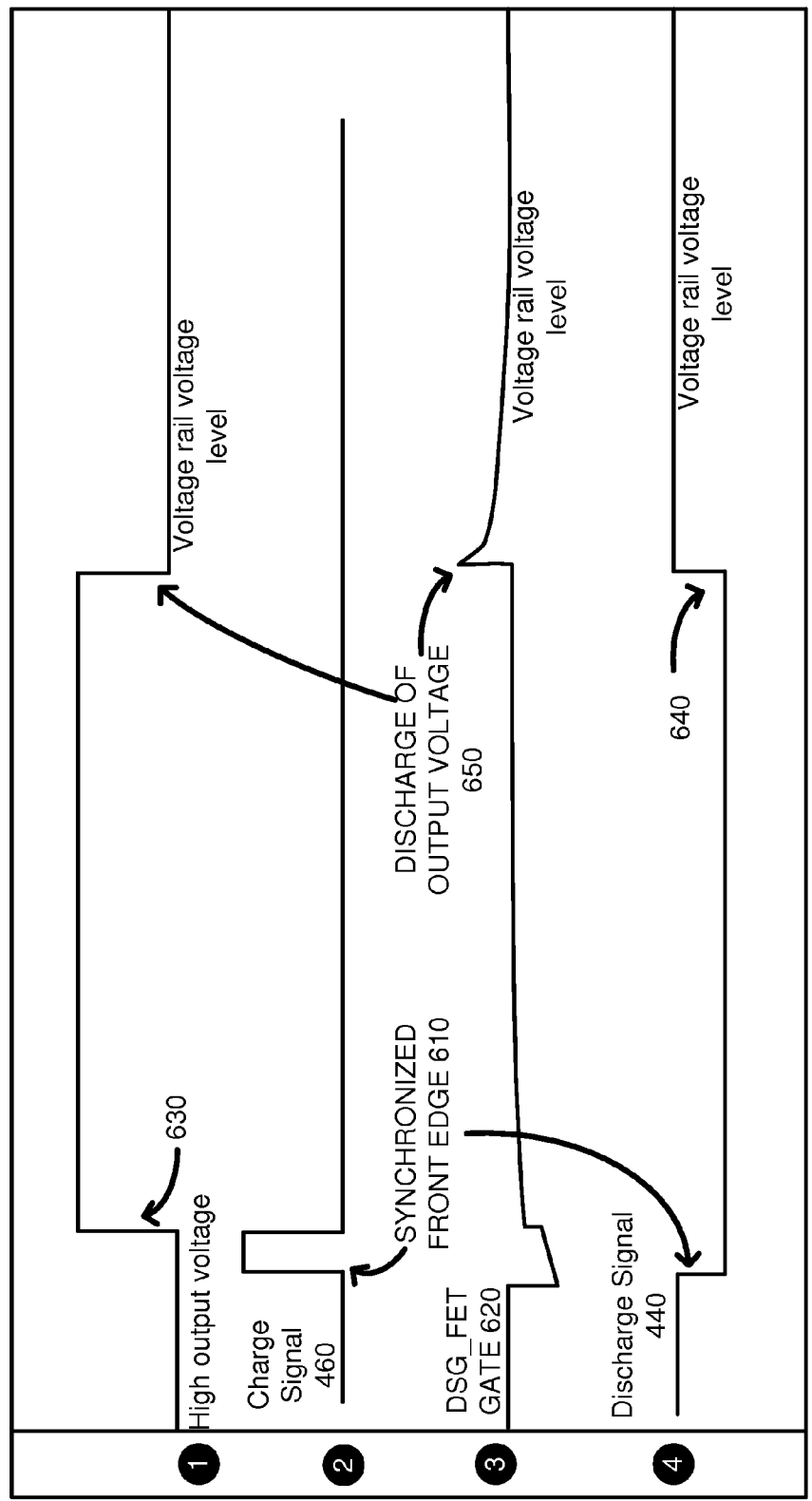
FIG. 6 is an exemplary timing diagram for signals used in conjunction with the circuit of FIG. 5.

FIG. 6 shows various exemplary waveforms that can be used in conjunction with the circuit of FIG. 5. As is shown, the charge signal 460 and the discharge signal 440 have a synchronized front edge 610 due to the Pulse Out P 430 signal (FIG. 4) from the logic block 410. The charge signal 460 is a pulse, the duration of which is controlled by the RC circuit 450 (FIG. 4). While the charge signal 460 pulses, the charging transistor 510 is activated (turned ON) and current flows from the voltage rail 544 through the inductor, through the charging transistor 510 to ground 520. The longer the duration of the pulse, the more current flows through the inductor 530 and the greater the output voltage that is ultimately generated. When the charge signal pulse ends, the charging transistor 510 is deactivated and the output voltage of the inductor spikes high as shown at 630. Due to the charge build up in the inductor, the output voltage (the voltage level supplied to antenna 350) can greatly exceed the voltage rail voltage level. For example, the output voltage can be from 5 to 10 times the voltage on the voltage rail. An example output voltage can be any voltage level between 10 and 100 volts.

The output voltage remains at a high voltage level until discharged. The discharge signal 440 switches as shown at 640 due to the logic block 410 detecting a threshold number of oscillator cycles as counted by counter 424. As a result, the AC coupling circuit generates a voltage spike on the gate voltage 620 above the voltage rail voltage level as indicated at 650. This voltage spike activates the discharging transistor 560 and drains the output node 590 to a voltage level of the voltage rail (e.g., the voltage level supplied by the battery). The duration of the discharge pulse 650 is controlled by the resistor/capacitor values in the AC coupling circuit 570.

Figure 7:
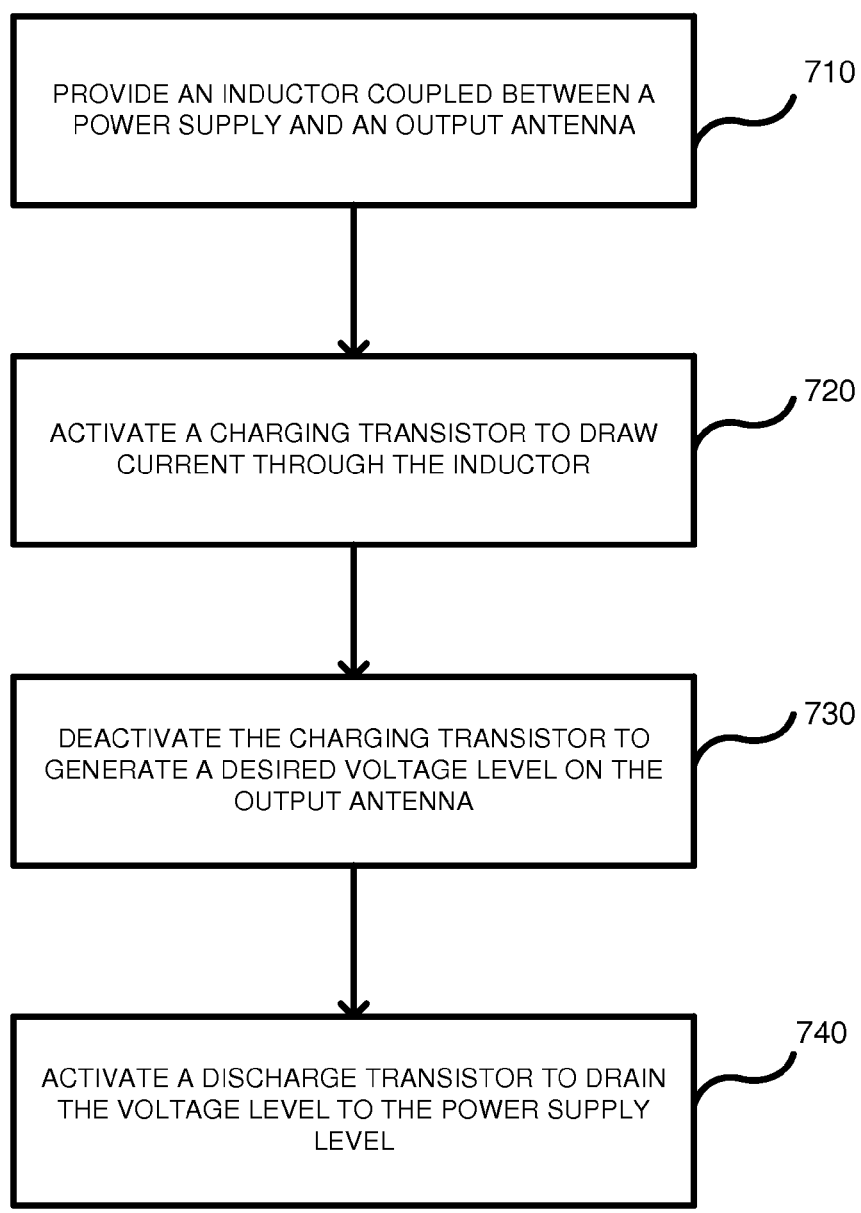
FIG. 7 is a flowchart of a method for producing a stylus pen output signal.

FIG. 7 is a flowchart of a method according to one embodiment for producing a stylus pen output signal. In process block 710, an inductor is provided that is coupled between a power supply and an output antenna. The power supply can be coupled to a power rail through a protective resistor. In process block 720, a charging transistor can be activated so as to draw current through the inductor. A longer duration of current through the inductor generates more storage potential and the length of a pulse controlling the charging transistor is dictated by an RC timing circuit. In process block 730, the charging transistor is deactivated, which causes a voltage spike on an output of the inductor that is maintained until the inductor is discharged. The activating and deactivating of the charging transistor is controlled by applying a pulse to the RC timing circuit, the output of which supplies the charging control signal. The voltage level on the output of the inductor is supplied to the antenna to produce the stylus pen output signal on the antenna. In process block 740, a discharge transistor is activated to drain the voltage level on the output of the inductor to the voltage level of the power supply. Power savings is derived by not draining the inductor voltage to ground. This power savings may be beneficial because it prolongs the life of the stylus battery. A longer battery life saves the user the cost of battery replacements or the inconvenience of having to recharge the battery often. Further, some stylus designs may prevent replacement or recharging of a battery, and thus, a longer battery life may lead directly to a longer stylus lifetime.

Figure 8:
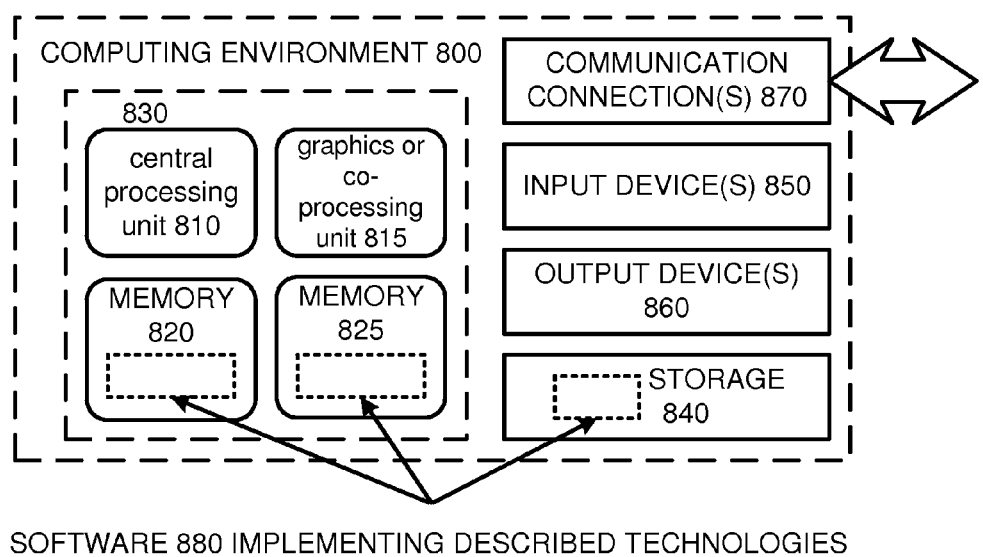
FIG. 8 is a diagram of an example computing environment in which some described embodiments can be implemented.

With reference to FIG. 8, the computing system 800 includes one or more processing units 810, 815 and memory 820, 825. One or more components within the computing system 800 can be included in the stylus pen to implement the functionality described herein. Alternatively, or in addition, the computing system can include functionality of a computing device for receiving signals from the stylus pen. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

In a very particular implementation, the described circuit was developed to use a 100 kHz input and generate the erase waveform that uses a 20 kHz and 25 khZ waveform at specific times. This circuit uses divide-by-four and divide-by-five circuitry internal to it to generate these waveforms. It counts 100 kHz pulses to establish the 10 uS accuracy. Once a sync signal is received, the timing begins with a pressure packet that is generated if a switch is pressed. After that, a beacon and digital packets are generated in their appropriate locations. All timing can be based upon the receipt of the sync signal.

For the 20 kHz/25 kHz waveforms, the logic provides a complementary output pair for the pulses. The positive pulse can be cut short due to the pulse-in pin being driven high (Schmitt trigger). The boost converter is made by a pulsing a charge FET for a fixed pulse width. This pulse width is defined by the RC on the ASIC that feeds back into the Schmitt trigger input. When the charge FET is turned off, the output voltage increases significantly—in this case between 10-20V, depending on the pulse width definition. When the stylus signal should be low, the discharge FET is pulsed to bring the signal back to the Vsupply rail. This reclaims much of the energy which yields a favorable low current performance. The boost converter remains off until it is time for the next "high" pulse in the stylus signal.

The advantages of the circuit include:
1. the use of a boost converter circuit used to generate the high voltage that matches the required stylus signal;
2. the use of an adjusted pulse width in an open-loop boost converter to change the pulse amplitude when erasing; and
3. the use of a hardware divider/counter that takes a standard frequency generates the stylus signal rather than synthesizing high frequencies then dividing down.

Alternative Embodiments

Various combinations of the embodiments described herein can be implemented. For example components described in one embodiment can be included in other embodiments and vice versa. The following paragraphs are non-limiting examples of such combinations:

A. A device, comprising:
a voltage boost circuit including a charging portion and a discharging portion;
the charging portion including an inductor coupled at a first end to a voltage rail and at a second end to an output node, the inductor second end further being coupled to a first terminal on a charging transistor; and
the discharging portion including a discharging transistor having a first terminal coupled to the output node and a second terminal coupled to the voltage rail so that the discharge transistor is operable to discharge the output node to the voltage rail.

B. The device of paragraph A, wherein the charging transistor is adapted to be activated by a first timing signal and the discharging transistor is adapted to be activated by a second timing signal, wherein a duration of pulses associated with the first and second timing signals are independently controlled through different resistor and capacitor-based circuits.

C. The device of paragraphs A or B, wherein the first timing signal is adapted to be generated by a resistor-capacitor timing circuit and the second timing signal is adapted to be generated using a resistor-capacitor coupling circuit.

D. The device of paragraphs A through C, wherein a third terminal of the discharging transistor, which controls activation of the discharging transistor, is coupled to an AC coupling circuit so as to be adapted to temporarily increase a voltage level on the third terminal above a voltage level on the voltage rail.

E. The device of paragraphs A through D, wherein a second terminal of the charging transistor is coupled to ground so that, when activated, current is adapted to flow from the voltage rail through the inductor and through the charging transistor to ground.

F. The device of paragraphs A through E, wherein the output node is coupled to an output antenna and the stylus pen is adapted to transmit user input signals over the antenna.

Alternative combinations can be as follows:
A. A stylus pen, comprising:
a power rail adapted to be coupled to a battery source;
an output antenna;
an inductor having a first end coupled to the power rail and a second end coupled to the output antenna;
a charging transistor having a first terminal coupled to the second end of the inductor, a second terminal coupled to ground, and a third terminal coupled to a charging control signal line; and
a discharging transistor having a first terminal coupled to the second end of the inductor, a second terminal coupled to the power rail, and a third terminal coupled to a discharging control signal line.

B. The stylus pen of paragraph A, wherein the third terminal of the discharging transistor is connected to an AC coupling circuit.

C. The stylus pen of paragraph A or B, wherein the charging control signal line is coupled to a resistor-capacitor timing circuit.

D. The stylus pen of paragraphs A through C, wherein the discharging control signal line is coupled to a counter circuit so that the discharging control signal line is independently controlled from the charging control signal line.

E. The stylus pen of paragraphs A through D, further including the battery source coupled to the power rail for producing a first voltage level, wherein the second end of the inductor is adapted to produce a second voltage level that is at least five times that of the first voltage level.

F. The stylus pen of paragraphs A through E, further including an oscillator circuit coupled to a counter, the counter being adapted to generate a discharge signal on the discharging control signal line.

G. The stylus pen of paragraphs A through F, further including a diode coupled between the first terminal of the discharging transistor and the first terminal of the charging transistor.

Other alternative combinations can be as follows:

A. A method of producing a stylus pen output signal, comprising:
   providing an inductor coupled between a power supply and an output antenna;
   activating a charging transistor to draw current from the power supply through the inductor;
   deactivating the charging transistor so as to generate a voltage level on the inductor output to the antenna that is greater than a voltage level of the power supply; and
   activating a discharging transistor coupled between the power supply and the output antenna so as to drain the voltage level on the inductor output to the power supply voltage level.

B. The method of paragraph A, wherein activating the discharging transistor includes generating a voltage level on a gate of the discharging transistor that exceeds the power supply voltage level by using an AC coupling circuit coupled to the gate.

C. The method of paragraphs A through B, wherein activating and deactivating the charging transistor includes applying a pulse to a resistor-capacitor circuit, the output of which supplies an input signal to a gate of the charging transistor.

D. The method of paragraphs A through C, wherein activating the discharging transistor includes counting clock cycles provided by an oscillator and controlling an input to a gate of the discharging transistor based on the count.

E. The method of paragraphs A through D, further including transmitting the stylus pen output signal from the output antenna using the voltage level generated on the inductor output.

F. The method of paragraphs A through E, wherein the stylus pen output signal is an erasure signal.

G. The method of paragraphs A through F, further including dividing a clock signal and using the divided clock in generating a signal to activate the discharge transistor.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A device comprising:
   a voltage boost circuit including a charging portion and a discharging portion;
   the charging portion including an inductor coupled at a first end to a voltage rail and at a second end to an output node, the inductor second end further being coupled to a first terminal on a charging transistor; and
   the discharging portion including a discharging transistor having a first terminal coupled to the output node and a second terminal coupled to the voltage rail so that the discharge transistor is operable to discharge the output node to the voltage rail, wherein the discharging transistor includes a resistor, which is a part of an AC-coupling circuit, coupled at one end to a gate of the discharge transistor and coupled at an opposite end to the voltage rail.

2. The device of claim 1, wherein the charging transistor is adapted to be activated by a first timing signal and the discharging transistor is adapted to be activated by a second timing signal, wherein a duration of pulses associated with the first and second timing signals are independently controlled through different resistor and capacitor-based circuits.

3. The device of claim 2, wherein the first timing signal is adapted to be generated by a resistor-capacitor timing circuit and the second timing signal is adapted to be generated using a resistor-capacitor coupling circuit.

4. The device of claim 1, wherein a third terminal of the discharging transistor, which controls activation of the discharging transistor, is coupled to an AC coupling circuit so as to be adapted to temporarily increase a voltage level on the third terminal above a voltage level on the voltage rail.

5. The device of claim 1, wherein a second terminal of the charging transistor is coupled to ground so that, when activated, current is adapted to flow from the voltage rail through the inductor and through the charging transistor to ground.

6. The device of claim 1, wherein the output node is coupled to an output antenna and the stylus pen is adapted to transmit user input signals over the antenna.

7. A stylus pen, comprising:
   a power rail adapted to be coupled to a battery source;
   an output antenna;
   an inductor having a first end coupled to the power rail and a second end coupled to the output antenna;
   a charging transistor having a first terminal coupled to the second end of the inductor, a second terminal coupled to ground, and a third terminal coupled to a charging control signal line;
   a discharging transistor having a first terminal coupled to the second end of the inductor, a second terminal coupled to the power rail, and a third terminal coupled to a discharging control signal line; and
   a resistor coupled between the second terminal and the third terminal of the discharging transistor.

8. The stylus pen of claim 7, wherein the third terminal of the discharging transistor is connected to an AC coupling circuit.

9. The stylus pen of claim 7, wherein the charging control signal line is coupled to a resistor-capacitor timing circuit.

10. The stylus pen of claim 9, wherein the discharging control signal line is coupled to a counter circuit so that the discharging control signal line is independently controlled from the charging control signal line.

11. The stylus pen of claim 7, further including the battery source coupled to the power rail for producing a first voltage level, wherein the second end of the inductor is adapted to produce a second voltage level that is at least five times that of the first voltage level.

12. The stylus pen of claim 7, further including an oscillator circuit coupled to a counter, the counter being adapted to generate a discharge signal on the discharging control signal line.

13. The stylus pen of claim 7, further including a diode coupled between the first terminal of the discharging transistor and the first terminal of the charging transistor.

14. A method of producing a stylus pen output signal, comprising:
   providing an inductor coupled between a power supply and an output antenna;
   activating a charging transistor to draw current from the power supply through the inductor;
   deactivating the charging transistor so as to generate a voltage level on the inductor output to the antenna that is greater than a voltage level of the power supply; and
   activating a discharging transistor coupled between the power supply and the output antenna so as to drain the voltage level on the inductor output to the power supply voltage level, wherein the discharging transistor includes a resistor coupled between a control signal line of the discharging transistor and a terminal of the discharging transistor coupled to the power supply voltage level.

15. The method of claim 14, wherein activating the discharging transistor includes generating a voltage level on a gate of the discharging transistor that exceeds the power supply voltage level by using an AC coupling circuit coupled to the gate.

16. The method of claim 14, wherein activating and deactivating the charging transistor includes applying a pulse to a resistor-capacitor circuit, the output of which supplies an input signal to a gate of the charging transistor.

17. The method of claim 16, wherein activating the discharging transistor includes counting clock cycles provided by an oscillator and controlling an input to a gate of the discharging transistor based on the count.

18. The method of claim 14, further including transmitting the stylus pen output signal from the output antenna using the voltage level generated on the inductor output.

19. The method of claim 18, wherein the stylus pen output signal is an erasure signal.

20. The method of claim 14, further including dividing a clock signal and using the divided clock in generating a signal to activate the discharge transistor.

* * * * *